(12) United States Patent
Zhu et al.

(10) Patent No.: US 7,464,267 B2
(45) Date of Patent: Dec. 9, 2008

(54) SYSTEM AND METHOD FOR SECURE TRANSMISSION OF RTP PACKETS

(75) Inventors: Yuesheng Zhu, San Jose, CA (US); Chih-Ping Lee, Cupertino, CA (US)

(73) Assignee: Innomedia Pte Ltd., Singapore (SG)

( * ) Notice: Subject to any disclaimer, the term of this patent is extended or adjusted under 35 U.S.C. 154(b) by 841 days.

(21) Appl. No.: 10/979,033

(22) Filed: Nov. 1, 2004

(65) Prior Publication Data
US 2006/0095766 A1    May 4, 2006

(51) Int. Cl.
  *H04L 9/00*    (2006.01)
(52) U.S. Cl. .................... 713/168; 713/171; 713/181; 726/4; 726/14; 709/227; 370/331
(58) Field of Classification Search .......... 726/2, 726/4, 6, 14; 713/168, 171, 181, 184; 709/222, 709/227, 229; 370/331; 380/30, 44
See application file for complete search history.

(56) References Cited

U.S. PATENT DOCUMENTS

| | | | | |
|---|---|---|---|---|
| 6,061,791 | A * | 5/2000 | Moreau ................ | 713/171 |
| 6,487,661 | B2 * | 11/2002 | Vanstone et al. ......... | 713/171 |
| 7,055,170 | B1 * | 5/2006 | Karmouch et al. ....... | 726/2 |
| 7,240,366 | B2 * | 7/2007 | Buch et al. .............. | 726/14 |
| 7,284,127 | B2 * | 10/2007 | Gehrmann .............. | 713/169 |
| 2005/0027985 | A1 * | 2/2005 | Sprunk et al. ........... | 713/171 |
| 2005/0232429 | A1 * | 10/2005 | Chowdhury et al. ..... | 380/277 |

OTHER PUBLICATIONS

Richard Brinkman et al, Secure Method Invocation in Jason, 2002, pp. 1-12.*
Si Duanfeng et al, Security Mechanism for SIP-Based Multimedia Communication Infastructure, IEEE, 2004, pp. 515-518.*
N. Dadoun, Security Framework for IP Telephony White Paper, Feb. 2002, pp. 1-21, Polycom, Inc.*

* cited by examiner

*Primary Examiner*—Nasser G Moazzami
*Assistant Examiner*—Shanto M Abedin
(74) *Attorney, Agent, or Firm*—Timothy P OHagan (57) ABSTRACT

A system and method for establishing a shared secret media key between each of a caller endpoint and a callee endpoint for securing a real time media channel comprises: i) establishing a caller authenticated signaling session with the caller endpoint using a caller shared secret authentication key and a symmetric encryption algorithm; and ii) establishing a callee authenticated signaling session with the callee endpoint using a callee shared secret authentication key and the symmetric encryption algorithm. A caller public value is received from the caller endpoint through the caller authenticated signaling session and sent to the callee endpoint through the callee authenticated signaling session. The caller public value is a public value of a pair of values generated by the caller endpoint and useful for calculating a shared secret media key. A callee public value is received from the callee endpoint through the callee authenticated signaling session and sent to the caller endpoint through the caller authenticated signaling session. The callee public value is a public value of a pair of values generated by the callee endpoint and useful for calculating a shared secret media key. Both the caller endpoint and the callee endpoint calculate the shared secret media key using Diffie-Hellman techniques.

6 Claims, 6 Drawing Sheets

| Digest Table | |
|---|---|
| Digest Value 1 | MD5 (EPT ID, K_initial, EPT_Public_1, Random #1) |
| Digest Value 2 | MD5 (Kpub, K_initial, CA_Public, Random #2) |
| Digest Value 3 | MD5 (Kpub, Random #3) |
| Digest Value 4 | MD5 (EPT ID, Kpub, Random #3) |
| Digest Value 5 | MD5 (Kpub, Random #4) |
| Digest Value 6 | MD5 (EPT ID, Kpub, Random #4) |
| Digest Value 7 | MD5 (EPT ID, Kpub, Random #5) |
| Digest Value 8 | MD5 (KpubA, EPT(A)_Public_2, Random #6) |
| Digest Value 9 | MD5 (KpubB, EPT(A)_Public_2, Random #7) |
| Digest Value 10 | MD5 (KpubB, EPT(B)_Public_2, Random #8) |
| Digest Value 11 | MD5 (KpubA, EPT(B)_Public_2, Random #9) |

Figure 5

| Extended RSIP 202 |
|---|
| RSIP Fields 204 |
| RSIP Extensions 206<br>　EA : 208<br>　Random : 210<br>　PV : 212<br>　Auth : 214 |

Figure 6a

| Extended RQNT 220 |
|---|
| RQNT Fields 222 |
| RQNT Extensions 224<br>　R : Auth/Auth OC 226<br>　S : Auth/PV 228a<br>　　Auth/Auth Req 228b<br>　　(Digest, Random) |

Figure 6b

| Extended NTFY 230 |
|---|
| NTFY Fields 232 |
| NTFY Extensions 234<br>X : 236<br>O : Auth/Auth OC 238 |

Figure 6c

| Extended CRCX 240 |
|---|
| CRCX Fields 242 |
| SDP Fields 243<br>  IP Addr 243a<br>  Port 243b |
| SDP Extensions 244<br>  a = Encryption Type : 246<br>  a = mgKey : 247<br>  a = Auth : 248<br>    (Digest, Random) |

Figure 6d

| Extended ACK 250 |
|---|
| ACK Fields 252 |
| SDP Fields 243<br>  IP Addr 243a<br>  Port 243b |
| SDP Extensions 244<br>  a = Encryption Type : 246<br>  a = mgKey : 247<br>  a = Auth : 248 |

Figure 6e

| Extended MDCX 254 |
|---|
| MDCX Fields 256 |
| SDP Fields 243<br>  IP Addr 243a<br>  Port 243b |
| SDP Extensions 244<br>  a = Encryption Type : 246<br>  a = mgKey : 247<br>  a = Auth : 248<br>    (Digest, Random) |

Figure 6f

| Client Authentication Table 52 ||||||||
|---|---|---|---|---|---|---|
| INDX | EPT ID 25 | Kpub 46 | Session Variables 53 ||||
| | | | CA_Private | CA_Public | EPT_Public | Current Random |
| 1 | EPT(A) | | | | | |
| 2 | EPT(B) | | | | | |
| 3 | EPT(C) | | | | | |

SYSTEM AND METHOD FOR SECURE TRANSMISSION OF RTP PACKETS

TECHNICAL FIELD

The present invention relates to real time media communications in a packet switched data network and, more specifically, to establishing a shared secret key between two real time protocol media endpoints for securing a real time media session there between.

BACKGROUND OF THE INVENTION

For many years voice telephone service was implemented over a circuit switched network commonly known as the public switched telephone network (PSTN) and controlled by a local telephone service provider. In such systems, the analog electrical signals representing the conversation are transmitted between the two telephone handsets on a dedicated twisted-pair-copper-wire circuit. More specifically, each telephone handset is coupled to a local switching station on a dedicated pair of copper wires known as a subscriber loop. When a telephone call is placed, the circuit is completed by dynamically coupling each subscriber loop to a dedicated pair of copper wires between the two switching stations.

A circuit switched system inherently has a level of security adequate for the day to day telephone communication needs of the average person—even when using DTMF driven menus for entering account numbers and passwords for accessing and/or performing financial transactions.

First, the circuit switched systems are relatively secure and reliably route a telephone call to the destination bound to the telephone number dialed. While possible to route a call (or many calls) to an "imposter" destination for purposes of using call content (such as DTMF tones representing account numbers and passwords) for criminal activity, the expense and complexity required to do so makes it an impractical means for average criminals.

Secondly, eves-dropping or wire-tapping requires coupling a listening device directly to the circuit—which is cumbersome. Wiretapping multiple lines anywhere but at a switching station requires coupling to each circuit. While it is theoretically possible for one with criminal intent to wire tap many lines, again, the expense and complexity required to do so makes it an impractical means for average criminals.

However, recently telephone service has been implemented over the Internet. Advances in the speed of Internet data transmissions and Internet bandwidth have made it possible for telephone conversations to be communicated using the Internet's packet switched architecture and the TCP/IP and UDP/IP protocols.

To promote the wide spread use of Internet telephony, the International Telecommunication Union (ITU) has developed the H.323 set of standards and the Internet Engineering Task Force (IETF) has developed the Session Initiation Protocol (SIP) and the Multi-Media Gateway Control Protocol (MGCP) for signaling and establishing peer-to-peer Voice-over-Internet Protocol (VoIP) media session.

In an example of using an MGCP system, an MGCP gateway, commonly called a multi-media terminal adapter (MTA), emulates a PSTN central office switch for supporting operation of one or more PSTN telephony devices. The MTA detects such events as on hook, off hook, and DTMF signaling and generates applicable notify (NTFY) messages to inform a remote MGCP call agent of each event. The MTA also receives various messages from the MGCP call agent and, in response, generates applicable in-band signals (such as ring, caller ID, and call waiting) on the PSTN link to the PSTN telephony device.

To establish a peer-to-peer media session between two MTAs, the calling MTA initiates the session by sending applicable notify (NTFY) messages to an MGCP call agent. The MGCP call agent sends a sequence of create connection (CRCX) messages and modify connection (MDCX) messages to each of the calling MTA and the callee MTA such that the two can establish a real time protocol (RTP) media session there between using UDP/IP channels.

A problem associated with such Internet telephony systems is that network architecture typically includes an architecture with "multi-drop" subnets wherein the frames representing an RTP media session are available to any other device coupled to the subnet. This architecture enables an individual to easily and inexpensively eves-drop on all of the RTP media sessions transmitted on the subnet. More specifically, applicable network systems and software which can be run on a personal computer (PC) coupled to the subnet could simultaneously detect, sequence, and record all RTP media session transmitted on the subnet. Further, if there is a desire to perpetuate financial fraud, the same PC would be capable of running software to detect DTMF tones representing account numbers and passwords within the various RTP media sessions.

It is certainly possible to encrypt the RTP media session to avoid eves-dropping. However known encryption systems and key management systems are ineffective, cumbersome and/or expensive when applied to a system that could include thousands of RTP endpoints establishing peer to peer media sessions for the exchange of real time media.

For example, an asymmetric encryption algorithm and digital certificates could be used for mutual authentication of the two RTP endpoints and to secure the RTP media session there-between. However, digital certificate distribution is cumbersome and costly. Further, asymmetric encryption systems require significant processing power. In an environment wherein the RTP media stream must be encrypted and deciphered within a limited period of time to avoid noticeable communication delays, the circuits required for implementing an asymmetric encryption algorithm would be extremely costly.

As another example, an asymmetric encryption algorithm and digital certificates could be used for mutual authentication of the two RTP media session endpoints, but a symmetric encryption algorithm and an agreed key could be used for securing the RTP media session. Such a system would have the benefit that the circuitry required for performing symmetric encryption and deciphering within the time frames required to avoid noticeable delay in an RTP media session is inexpensive and readily available. However, each RTP media session endpoint would still be required to perform asymmetric encryption algorithms and have expensive digital certificate technology for mutual authentication and for the exchange of messages needed for mutual ascent to the symmetric encryption key.

As yet another example, a symmetric encryption algorithm using Diffie-Hellman key agreement could be used for mutual ascent to the symmetric encryption key for securing the media session. Because a symmetric key calculated by each MTA using Diffie-Hellman can not be derived from the Diffie-Hellman public values exchanged over the network, eves-dropping on the media session by a third party is computationally infeasible. However, if the exchange of Diffie-Hellman public values occurs using plain text, there is no mutual authentication. An imposter on the subnet could place itself between the two legitimate endpoints and substitute its own Diffie-Hellman public values in message key agreement exchanges with each endpoint—thereby becoming a "middle-man" through which the RTP media session is translated. The middle-man would then have access to the unencrypted RTP media session.

Of course, an asymmetric encryption algorithm could be used for mutual authentication of the two RTP media session endpoints and to secure the exchange of Diffie-Hellmen key agreement messages. However, in which case: i) Diffie-Hellman adds no value because the key exchange channel is secured using the asymmetric encryption algorithms—less complex key agreement schemes could be used. Further, each RTP media session endpoint would still be required to perform asymmetric encryption algorithms and have expensive digital certificate technology for mutual authentication and for the exchange of messages needed for mutual ascent to the symmetric encryption key.

What is needed is a system and method for securing an RTP media session that does not suffer the disadvantages of known systems. What is needed is a system and method for securing an RTP media session that does not require digital certificate distribution (or distribution of other mutual authentication systems) to each of multiple RTP media session endpoints and/or the performance of asymmetric encryption algorithms by each of multiple RTP media session endpoints.

SUMMARY OF THE INVENTION

A first aspect of the present invention is to provide a system and method for establishing a shared secret media key between each of a caller endpoint and a callee endpoint. The method comprises: i) establishing a caller authenticated signaling session with the caller endpoint using a caller shared secret authentication key and an authentication hash algorithm; and ii) establishing a callee authenticated signaling session with the callee endpoint using a callee shared secret authentication key and the authentication hash algorithm.

A caller public value is received from the caller endpoint through the caller authenticated signaling session and sent to the callee endpoint through the callee authenticated signaling session. The caller public value is a public value of a pair of Diffie-Hellman values generated by the caller endpoint and useful for calculating a shared secret media key.

A callee public value is received from the callee endpoint through the callee authenticated signaling session and sent to the caller endpoint through the caller authenticated signaling session. The callee public value is a public value of a pair of Diffie-Hellman values generated by the callee endpoint and useful for calculating a shared secret media key.

After the caller public value and the callee public value are exchanged, both the caller endpoint and the callee endpoint calculate the shared secret media key using Diffie-Hellman techniques.

In the exemplary embodiment, the authenticated signaling session with the caller is also established using Diffie-Hellman techniques. More specifically, establishing the authenticated signaling session with the caller endpoint comprises receiving a first public value from the caller endpoint as part of a message that is authenticated using the authentication hash algorithm and a predetermined key. The first public value is a public value of a first Diffie-Hellman pair of values (different from the Diffie-Hellman values used for calculating the media key) generated by the caller endpoint and useful for calculating the caller shared secret authentication key.

A local public value and a local private value of a Diffie-Hellman pair of values are generated. The caller shared secret authentication key is calculated from the local private value and the first public value received from the caller endpoint. And, the local public value is provided to the caller endpoint through the authenticated signaling session using the authentication hash algorithm and the predetermined key.

Similarly, the authenticated signaling session with the callee is established using Diffie-Hellman techniques. More specifically, establishing the authenticated signaling session with the callee endpoint comprises receiving a first public value from the callee endpoint as part of a message authenticated using the authentication hash algorithm and a predetermined key associated with the callee endpoint. The first public value is a public value of a first Diffie-Hellman pair of values (different from the Diffie-Hellman values used for calculating the media key) generated by the callee endpoint and useful for calculating the callee shared secret authentication key.

A local public value and a local private value of a Diffie-Hellman pair of values (different that the values used for calculating the caller shared secret authentication key) are generated. The callee shared secret authentication key is calculated from the local private value and the first public value received from the callee endpoint. And, the local public value is provided to the callee endpoint through the authenticated signaling session using the authentication hash algorithm and the predetermined key associated with the callee endpoint.

Further, in the exemplary embodiment, the method further comprises receiving a caller session description for a media session to be secured using a symmetric encryption algorithm and the shared secret media key. The caller session description is received from the caller endpoint in conjunction with the caller public value and through the caller authenticated signaling session. The caller session description is then sent to the callee endpoint in conjunction with the caller public value and through the callee authenticated signaling session.

Similarly, the callee session description is received from the callee endpoint in conjunction with the callee public value and through the callee authenticated signaling session and sent to the caller endpoint in conjunction with the callee public value and through the caller authenticated signaling session.

For a better understanding of the present invention, together with other and further aspects thereof, reference is made to the following description, taken in conjunction with the accompanying drawings, and its scope will be pointed out in the appended clams.

Detailed Description of the Exemplary Embodiments

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation in the drawings. A reference number without a specific letter designation refers to all elements with the same reference number independent of any letter designation following the reference number in the drawings.

It should also be appreciated that many of the elements discussed in this specification may be implemented in a hardware circuit(s), a processor executing software code, or a combination of a hardware circuit(s) and a processor or control block of an integrated circuit executing machine readable code. As such, the term circuit, module, server, or other equivalent description of an element as used throughout this specification is intended to encompass a hardware circuit (whether discrete elements or an integrated circuit block), a processor or control block executing code, or a combination of a hardware circuit(s) and a processor and/or control block executing code.

Figure 1:
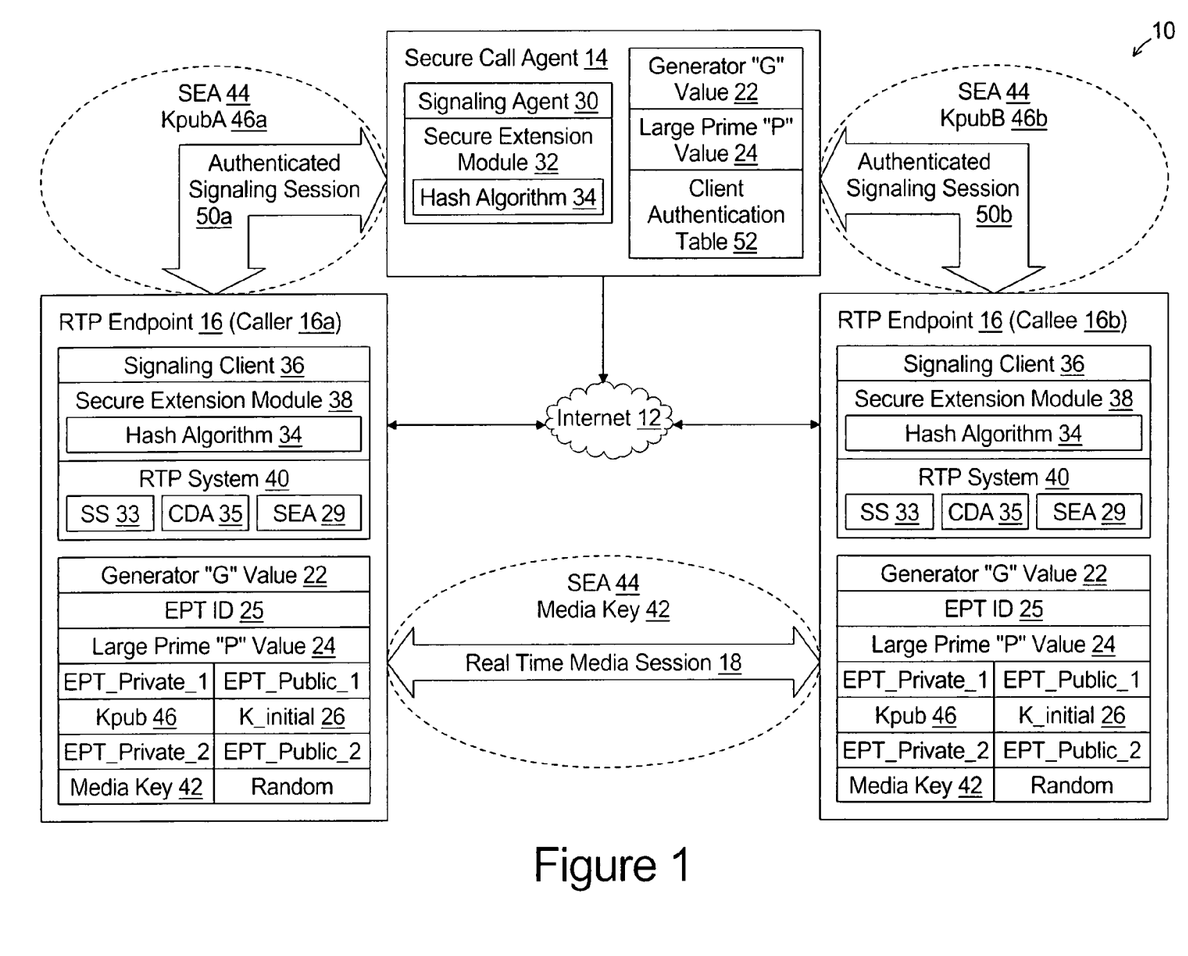
FIG. 1 is a block diagram of a system and method for the secure transmission of frames representing a real time protocol media session in accordance with one embodiment of the present invention.

The block diagram of FIG. 1 represents a first implementation of a system 10 establishing a secure peer to peer real time protocol (RTP) media session 18 between two RTP endpoints 16 (e.g. a caller RTP endpoint 16a and a callee RTP endpoint 16b) wherein the real time media is encrypted using a symmetric encryption algorithm 44 and a media session secret key 42. The RTP endpoints 16 may be multimedia terminal adapters (MTA)s, trunking gateways, or other RTP endpoint devices useful for implementing a real time protocol media exchange.

RTP Endpoint

Each RTP endpoint 16 may include a known RTP system 40, a signaling client 36, and a secure extension module 38 for providing telephone service to telephone handsets (not shown) under the control of the secure call agent 14.

The RTP system 40 may be embodied in a DSP and emulates PSTN subscriber loop signals on each PSTN port for interfacing with a traditional PSTN device (not shown) utilizing in-band analog or digital PSTN signaling. The RTP system 40 operates signaling systems 33, compression/decompression algorithms 35, and a symmetric encryption algorithm 29.

The signaling systems 33 couple between the signaling client 36 and a plurality of PSTN ports (not shown) and: i) detect PSTN events on the PSTN port such as Off Hook, On Hook, Flash Hook, DTMF tones, Fax Tones, TTD tones and inform the signaling client 36 thereof; and ii) generate PSTN signaling such as Ring, Dial Tone, Confirmation Tone, CAS Tone and in band caller ID in accordance with information provided by the signaling client 36.

The compression/decompression algorithms 35 convert between: i) the digital media of an RTP media session 18 with a remote RTP endpoint 16; and ii) PSTN media exchanged with the PSTN device. Exemplary compression/decompression algorithms 35 utilized by the RTP system 40 include: i) algorithms that provide minimal (or no) compression (useful for fax transmission) such as algorithms commonly referred to as G.711, G.726; ii) very high compression algorithms such as algorithms commonly referred to as G.723.1 and G.729D; and iii) algorithms that provide compression and high audio quality such as algorithms commonly referred to as G.728, and G.729E.

The symmetric encryption algorithm 29 may be known symmetric encryption algorithm (such as AES) using a symmetric encryption key (referred to as the media key 42) for encrypting the data frames representing the RTP media session 18 for secure transmission to a remote system and deciphering of encrypted data frames (representing the RTP media session 18) received from a remote system.

The signaling client 36 couples to the RTP System 40 and communicates with the secure call agent 14 for exchanging information necessary for establishing the peer to peer RTP media session 18 with a remote RTP endpoint 16. For purposes of illustrating the present invention, the signaling client 36 may be a known MGCP gateway module which performs at least the following known MGCP gateway functions which relate to session signaling and establishing a peer to peer RTP media session 18 with another RTP endpoint 16: i) generate restart in progress (RSIP) messages to the call agent 14 (identified by IP address) when the RTP endpoint 16 is being put into service (such as at power up); ii) generate notify (NTFY) messages to inform the call agent 14 of various events such as on hook, off hook, dialing and ringing of one of the telephones (not shown) supported by the RTP endpoint 16; and iii) provides an applicable response message in response to any of a request notification (RQNT) message, a create connection (CRCX) message, and a modify connection (MDCX) message, which may be received from a call agent 14.

The secure extension module 38 operates in conjunction with the signaling client 36 for exchanging information with the call agent 14 and making calculations which: i) establish an authenticated signaling session 50 with the call agent 14 (e.g. authenticates each signaling message exchanged with the call agent using a digest generated by a hash algorithm 34); and ii) establish the secure real time media session 18 with a remote RTP endpoint 16 and the use of media key 42 for the encryption of the real time media transferred there between. A more detailed discussion of the operation of the secure extension module 38 is included herein with respect to the ladder diagrams of FIGS. 2, 3, and 4.

Secure Call Agent

The secure call agent 14 includes a signaling agent 30, a secure extension module 32, and a client authentication table 52 stored in a non-volatile storage. The non-volatile storage may also store a generator value 22 and a large prime value 24—each of which is discussed in more detail herein.

The signaling agent 30 may be a known system which operates in accordance with known MGCP protocols. For purposes of illustrating the present invention, the call agent 24 performs at least the following known MGCP call agent functions: i) generates applicable request notification (RQNT) messages to supported gateways; ii) generates applicable create connection (CRCX) messages to supported gateways; iii) generates applicable modify connection (MDCX) messages to supported gateways; and iv) generates applicable responses to each of a restart in progress (RSIP) message and a notify (NTFY) message which may be received from a supported gateway.

The secure extension module 32 operates in conjunction with the signaling agent 30 for exchanging information with the RTP endpoint 16 and making calculations which: i) authenticate the contents of each signaling message exchanged with the RTP endpoint 16 using a digest generated by a hash algorithm 34; and ii) facilitate the exchange of information between two remote RTP endpoints 16 such that a secure real time media session 18 may be established there between. A more detailed discussion of the operation of the secure extension module 38 is included herein.

Authenticated Signaling Session

Figure 2:
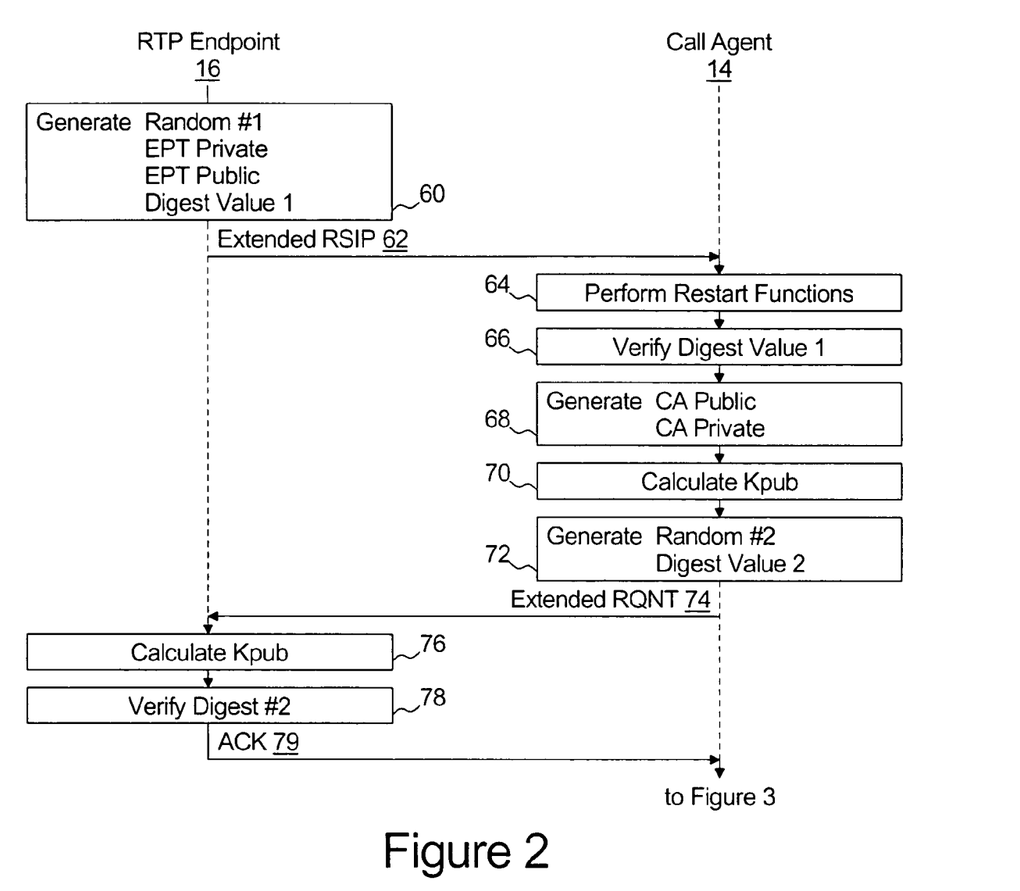
FIG. 2 is a ladder diagram representing a system and method for establishing an authenticated signaling session between an RTP endpoint and a call agent in accordance with one embodiment of the present invention.

The ladder diagram of FIG. 2 represents exemplary steps performed by each RTP endpoint 16 and the call agent 14 supporting the RTP endpoint 16 to establish an authenticated signaling session 50 there between. For purposes of keeping the figures un-cluttered, various known MGCP messages (which do not include the extensions for the present invention) are not shown in the diagrams and are not discussed. For example, many standard MGCP ACK messages are not shown or discussed. Those skilled in the art will recognize where known MGCP messaging must be performed for the implementation of the present invention.

An authenticated signaling session 50 is established when an RTP endpoint 16 is first powered and coupled to the network and at any other time in which it is appropriate to restart its secure session 50 with the call agent 14 (e.g. when MGCP protocols would require the RTP endpoint 16 to initiate a restart in progress).

In a known MGCP implementation, a session begins with the RTP endpoint providing a restart in progress (RSIP) message to the call agent 14. However, with brief reference to FIG. 6a in conjunction with FIG. 2, in the present invention, the RSIP message is an extended RSIP message 202 which includes not only typical RSIP fields 204 compliant with the MGCP specification, but also includes RSIP extensions 206 related to establishing the callee authenticated signaling session 50.

Figure 6A:
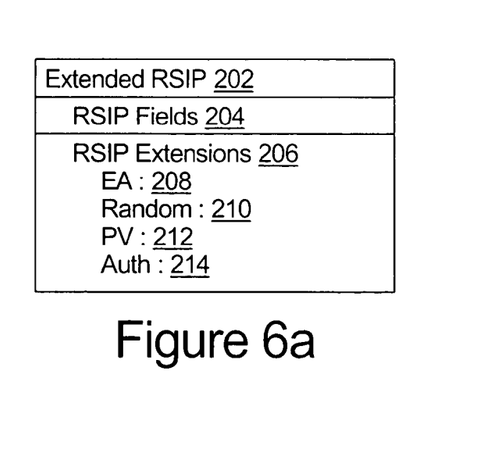
FIG. 6a is a table representing an extended RSIP message in accordance with one embodiment of the present invention.

The RSIP extensions 206 include: i) an endpoint algorithm (EA) identifier field 208 for inclusion and identification of the authentication hash algorithm capabilities of the RTP endpoint 16 (for example MD5 or SHA1); ii) a random number field 210 for inclusion and identification of a random number; iii) a public value field 212 for inclusion and identification of a public value useful for calculating a security key (Kpub) 46 using the Diffie-Hellman key agreement system; and iv) a digest field 214 for inclusion and identification of a digest value.

The RTP endpoint 16 generates the RSIP message extension values prior to sending the extended RSIP message 202 to the call agent 14. As such, step 60 represents generating and storing in applicable fields of a non-volatile memory structure: i) a first random number, ii) a first public value useful for calculating the security key (Kpub) 46 using Diffie-Hellmen systems (EPT_Public_1), iii) a first private value useful for calculating the security key (Kpub) 46 using Diffie-Hellman systems (EPT_Private_1); and iv) a first digest value 501.

EPT_Public_1 and EPT_Private_1 are mathematically related with EPT_Private_1 being a random integer value between 1 and a predetermined large prime number 24 referred to as "P". EPT_Public_1 is calculated as:

$$EPT\_Public\_1 = G^{(EPT\_Private\_1)} \bmod P.$$

The value "G" is a predetermined integer value referred to as a generator value 22. Neither "P" nor "G" is secret and both are stored in non volatile memory by the call agent 14 and each RTP endpoint 16 supported by the call agent 14.

Figure 5:
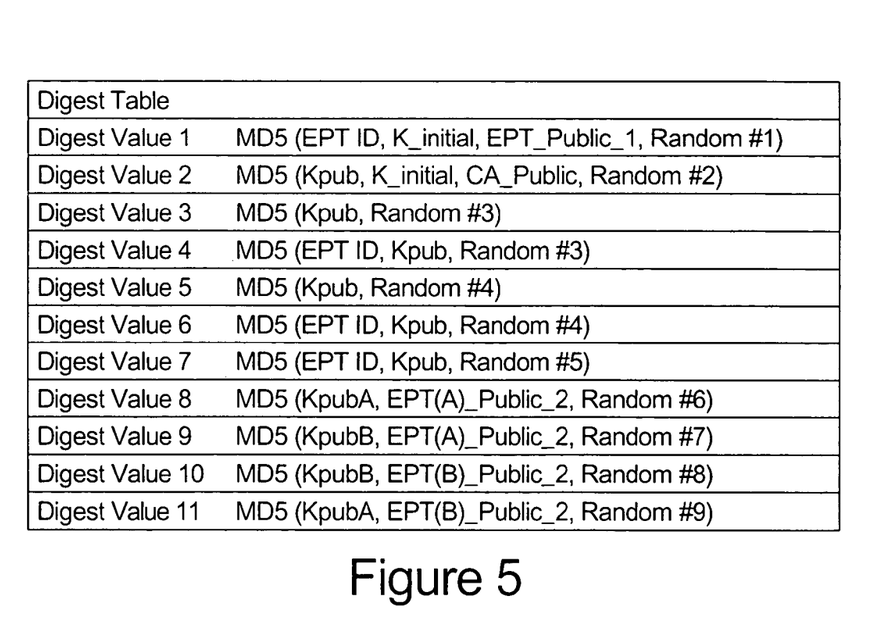
FIG. 5 is a table representing the contents of each of a plurality of digests used for implementing the system and method for the secure transmission of frames representing a real time protocol media session in accordance with one embodiment of the present invention.

Referring briefly to the table of FIG. 5 in conjunction with FIG. 1, the first, digest value 501 is the result of performing the predetermined hash algorithm 34 (such as the hash algorithm known as the MD5 digest generation algorithm which can accept an input value of a random length and generate an output has value of a fixed length) on a combination of: i) the unique identifier (EPT ID) 25 of the RTP endpoint 16 as stored in the non volatile memory structure of the RTP endpoint 16 and registered in the client authentication table 52 of the call agent 14 (discussed herein with respect to FIG. 7); ii) an initial security key ("K_initial) 26 as stored in the non volatile memory structure of the RTP endpoint 16 and stored by the call agent 14 in its client authentication table 52; iii) EPT_Public_1; and iv) the first random number.

Returning to FIG. 2, step 62 represents the RTP endpoint 16 sending the extended RSIP message 202 to the call agent 14.

In the exemplary embodiment, each RTP endpoint 16 shipped from the factory has a common value of K_initial 26 stored therein. However, after each calculation of Kpub 46, the stored value of K_initial 26 is updated to the most current value of Kpub 46. As such, after the very first RSIP exchange, the common value of K_initial 26 is no longer used and the most recent value of Kpub 46 becomes the K_initial 26 for use in the next subsequent RSIP exchange. It is recognized therefore that the secrecy of the initial common value of K_initial 26 is compromised, however, because it is only used for the first RSIP exchange before being updated to a value based on a random number, it provides adequate security for the type of applications discussed herein.

After the call agent 14 receives the extended RSIP message 202 at step 62, the signaling agent 30 performs known MGCP restart functions at step 64. Further, at step 66, the message extension module 32 of the signaling agent 30 verifies the the first digest value 501. More specifically, the message extension module 32 performs the MD5 hash algorithm 34 on a combination of: i) the EPT ID 25 of the RTP endpoint 16 as provided in the RSIP fields 204 of the extended RSIP message 202; ii) the K_initial 26 that is associated (in the client authentication table 52) with the EPT ID 25; iii) EPT_Public_1 as provided in the public value field 212 of the RSIP extension 206; and iv) the first random number as provided in the random number field 210 of the RSIP extensions 206.

If the result of the message extension module 32 performing the MD5 hash algorithm 34 matches the first digest value 501 value provided in the digest field 214 of the RSIP extensions 206, the digest value is verified. If the first digest value 501 does not verify, the call agent 14 does not permit the RTP endpoint 16 to establish a session.

After verification of the first digest value 501 at step 66, the extension module 32, at step 68, generates its own public value (CA_Public) and private value (CA_Private) pair useful for security key agreement using the Diffie-Hellman system. Similar to EPT_Public_1 and EPT_Private_1, CA_Public and CA_Private are mathematically related with the CA_Private value being a random integer value between 1 and the predetermined large prime number 24 referred to as "P". CA_Public is calculated as:

$$CA\_Public = G^{(CA\_Private)} \bmod P.$$

Again, the value "G" is the predetermined integer value referred to as the generator value 22 and both "P" and "G" are stored in non volatile memory of the secure call agent 14.

At step 70 the extension module 32 calculates the shared secret security key (Kpub) 46 for use with the authenticated signaling session 50. Kpub 46 is calculated as:

$$Kpub = (EPT\_Public\_1)^{(CA\_Private)} \bmod P.$$

At step 72, the extension module 32 generates a second digest value 502. Referring again to FIG. 5, the second digest value 502 is the result of performing the MD5 hash algorithm 34 on a combination of: i) Kpub 46; ii) K_initial 26; iii) CA_Public; and iv) the second random number.

Figure 7:
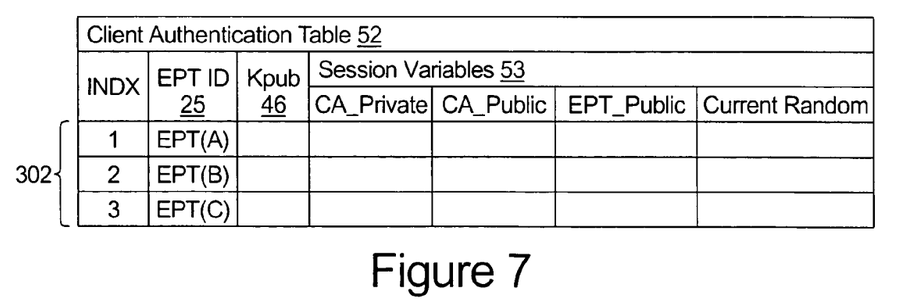
FIG. 7 is a table representing a client authentication table in accordance with one embodiment of the present invention.

Referring briefly to FIG. 7 in conjunction with FIG. 2, the client authentication table 52 comprises a plurality of records 302, each of which associates an RTP endpoint 16, identified by its EPT ID 25, with its then current Kpub 46 and session variables 53. The session variables comprise the CA_private and CA_public values determined for the session at step 68, EPT_Public as provided by the RTP endpoint 16, and the then current random number.

Step 73 represents writing to the record 302 that associates with the EPT ID 25 each of: Kpub, CA_Private, CA_Public, EPT_Public_1, and the second random number.

Figure 6B:
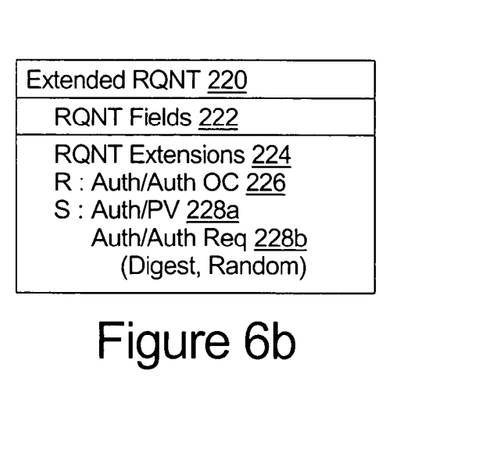
FIG. 6b is a table representing an extended RQNT message in accordance with one embodiment of the present invention.

Step 74 represents the call agent 14 sending an extended RQNT message 220 to the RTP endpoint 16. Referring to FIG. 6b in conjunction with FIG. 2, an exemplary extended RQNT message 220 comprises typical RQNT fields 222 compliant with known MGCP messaging specification as well as RQNT extensions 224.

The RQNT extensions 224 include an "R:" field 226, an and an "S:" field with: i) an "auth/dh" subfield 228a for inclusion and identification of a public value useful for calculating the security key Kpub 46; and ii) an "auth/authreq" subfield 228b for identification and inclusion of the encryption method, a digest value, and a random number. Step 74 includes populating CA_Public into the "auth/dh" subfield 228a and populating each of the second digest value 502 and the second random number into the "auth/authreq" subfield 228b before sending to the RTP endpoint 16.

Returning to the ladder diagram of FIG. 2, after the RTP endpoint 16 receives the extended RQNT message 220 at step 74, it calculates, at step 76 the value of Kpub as:

$$Kpub = CA\_Public^{(EPT\_Private\_1)} \bmod P.$$

Further, at step 78, the secure extension module 38 of the RTP endpoint 16 verifies the second digest value 502. More specifically, the RTP endpoint 16 performs the MD5 hash algorithm 34 on a combination of: i) Kpub as calculated at step 76; ii) the K_initial 26 stored locally by the RTP endpoint 16; iii) CA_Public as provided in the extended RQNT message 220 at step 74; and iv) the second random number—also as provided in the extended RQNT message 220.

If the result of the RTP endpoint 16 performing the MD5 hash algorithm 34 matches the second digest value 502 provided in the extended RQNT message 220, the digest is verified and the RTP endpoint 16 provides an ACK message back to the call agent 14 at step 79. If the second digest value 502 does not verify, the RTP endpoint 16 does not establish a session.

Figure 3:
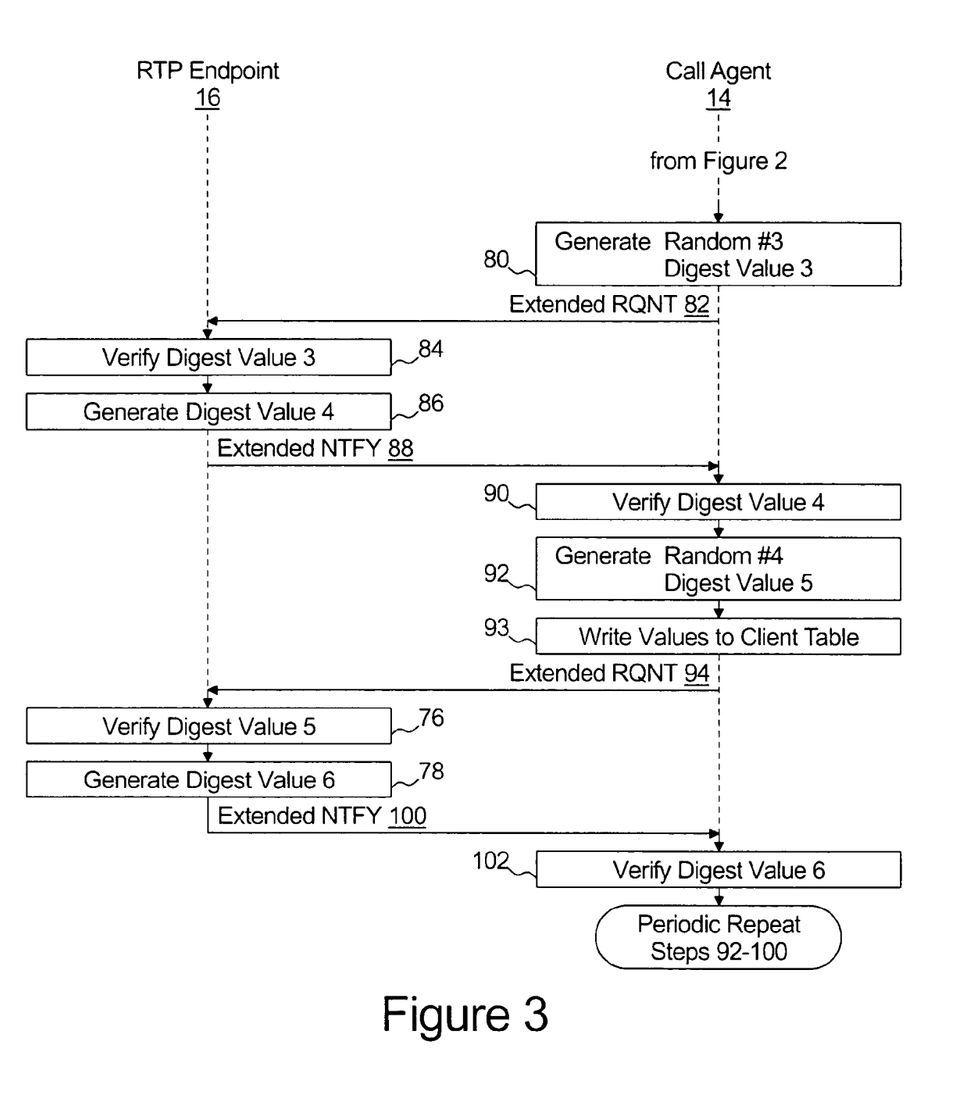
FIG. 3 is a ladder diagram representing a system and method for authenticating an RTP endpoint in accordance with one embodiment of the present invention.

The ladder diagram of FIG. 3 represents exemplary steps performed by the RTP endpoint 16 and the call agent 14 to authenticate the RTP endpoint 16. Step 80 represents the message extension module 32 of the call agent 14 generating a third random number and a third digest value 503. Referring briefly to FIG. 5, the third digest value 503 is the result of performing the MD5 hash algorithm 34 on a combination of: i) Kpub; and ii) the third random number.

Returning to FIG. 3, step 81 represents recording the third random number as the current random number in the record 302 that associates with the RTP endpoint 16 in the client authentication table 52 (FIG. 7).

Referring to FIG. 6b in conjunction with FIG. 3, step 82 represents the call agent 14 populating the third random number and the third digest value 503 into the "auth/authreq" subfield 228b of the extended RQNT message 220 and sending the extended RQNT message 220 to the RTP endpoint 16.

After receiving the second extended RQNT message 220, the secure extension module 38 of the RTP endpoint 16, at step 84, verifies the third digest value 503. More specifically, the RTP endpoint 16 performs the MD5 hash algorithm 34 on a combination of: i) Kpub as calculated at step 76 of FIG. 2; and ii) the third random number as provided in the extended RQNT message 220 at step 82.

After verifying the third digest value 503, the secure extension module 38 of the RTP endpoint 16 generates a fourth digest value 504 at step 86. Referring briefly to FIG. 5, the fourth digest value 504 is the result of performing the MD5 hash algorithm 34 on a combination of: i) the EPT ID 25; ii) Kpub 46; and iii) the third random number.

Returning to FIG. 3, step 88 represents the RTP endpoint 16 sending an extended NTFY message 230 to the call agent 14.

Figure 6C:
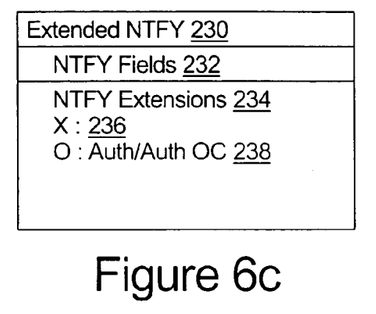
FIG. 6c is a table representing an extended NTFY message in accordance with one embodiment of the present invention.

Turning briefly to FIG. 6c in conjunction with FIG. 3, an extended NTFY message 230 comprises typical NTFY fields 232 compliant with known MGCP messaging specifications as well as NTFY extensions 234. The NTFY extensions 234 include an "x:" field 236 and an "o: auth/authoc" field 238 with subfields for identification and inclusion of the encryption method and a digest value. Step 88 represents populating the fourth digest value 504 into the "o: auth/authoc" field 238 prior to sending the extended NTFY message 230 to the call agent 14.

Returning to FIG. 3, at step 90, the message extension module 32 of the call agent 14 verifies the fourth digest value 504. More specifically, the message extension module 32 performs the MD5 hash algorithm 34 on a combination of: i) the EPT ID 25 as provided in the NTFY fields 232 of the extended NTFY message 230; ii) Kpub 46 as associated with the EPT ID 25 in the client authentication table 52 (FIG. 7); and iii) the third random number—also as associated with the EPT ID 25 in the client authentication table 52. If the result of the message extension module 32 performing the MD5 hash algorithm 34 matches the fourth digest value 504 provided in the extended NTFY message 230, the digest is verified.

Thereafter, at periodic time intervals, the call agent 14 may periodically initiate repeat authentication of the RTP endpoint 16 as represented by steps 92 through 102. More specifically, step 92 represents the message extension module 32 of the call agent 14 generating a fourth random number and a fifth digest value 505. Referring briefly to FIG. 5, the fifth digest value 505 is the result of performing the MD5 hash algorithm 34 on a combination of: i) Kpub; and ii) the fourth random number.

Returning to FIG. 3, Step 93 represents recording the fourth random number as the current random number in the record 302 of the client authentication table 52 (FIG. 7).

Step 94 represents the call agent 14 populating the fourth random number and the fifth digest value 505 into the "auth/ authreq" subfield 228b of an extended RQNT message 220 (FIG. 6b) and sending the extended RQNT message 220 to the RTP endpoint 16.

After receiving the extended RQNT message 220, the secure extension module 38 of the RTP endpoint 16, at step 96, verifies the fifth digest value 505. More specifically, the RTP endpoint 16 performs the MD5 hash algorithm 34 on a combination of: i) Kpub calculated at step 76 (FIG. 2); and ii) the fourth random number as provided in the extended RQNT message 220 at step 94.

Step 98 represents the secure extension module 38 of the RTP endpoint 16 generating a sixth digest value 506. The sixth digest value 506 is the result of performing the MD5 hash algorithm 34 on a combination of: i) the EPT ID 25; ii) Kpub; and iii) the fourth random number.

Step 100 represents the RTP endpoint 16 populating the sixth digest value 506 into the "o: auth/authoc" field 238 of an extended NTFY message 230 (FIG. 6c) and sending the extended NTFY message 230 to the call agent 14.

At step 102, the message extension module 32 of the call agent 14 verifies the sixth digest value 506 in the same manner as discussed with respect to step 90.

It should be appreciated that each RTP endpoint 16 supported by the call agent 14 performs the steps discussed with respect to the ladder diagrams of FIG. 2 and FIG. 3 to start and maintain an authenticated signaling session 50 with the call agent 14.

Establishing Secure Real Time Media Session

Figure 4:
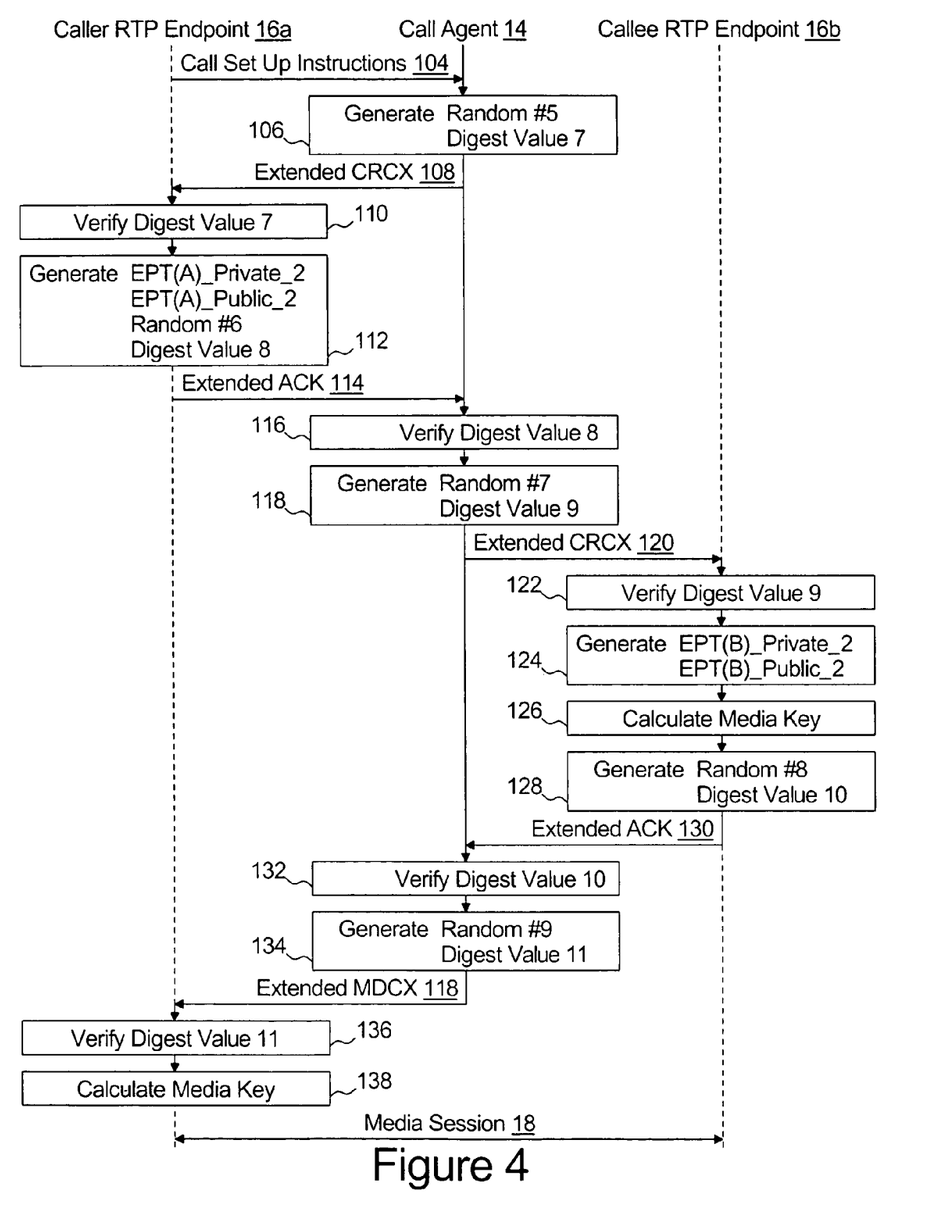
FIG. 4 is a ladder diagram representing a system and method for establishing a secure real time media session between two RTP endpoints in accordance with one embodiment of the present invention.

Turning to FIG. 4 in conjunction with FIG. 1, a ladder diagram representing exemplary message exchange for the set up of a secure media session 18 between two RTP endpoints 16 (for example caller RTP endpoint 16a and callee RTP endpoint 16b) is shown.

For purposes of discussion of the exchange of messages between the call agent 14 and multiple RTP endpoints 16 (such as caller RTP endpoint 16a and callee RTP endpoint 16b), the following terminology will be applicable. The value of Kpub with respect to the caller RTP endpoint 16a is referred to as KpubA and such value with respect to the callee RTP endpoint 16b is referred to as KpubB.

The values of EPT_Public_1 and EPT_Private_1 with respect to the caller RTP endpoint 16a will be referred to as EPT(A)_Public_1 and EPT(A)_Private_1. Similarly, such values with respect to the callee RTP endpoint 16b will be referred to as EPT(B)_Public_1 and EPT(B)_Private_1.

Step 104 represents applicable messaging for the caller RTP endpoint 16a to identify the callee RTP endpoint 16b for initiation of a media session. The applicable messaging may include multiple extended NTFY messages identifying various actions taken by a user to "dial" the callee RTP endpoint 16b. Each extended NTFY message may sent using the authenticated signaling session 50a (e.g. includes the result of performing an MD5 hash algorithm 34 on values within the NTFY message in addition to the then current value of Kpub 46 and a random number).

Step 106 represents the secure extension module 32 of the call agent 14 generating a fifth random number and a seventh digest value 507. Returning again to FIG. 5, the seventh digest value 507 comprises the result of performing the MD5 hash algorithm 34 on a combination of: i) the EPT_ID 25 of the caller RTP endpoint 16b; ii) KpubA 24a; and iii) the fifth random number.

Figure 6D:
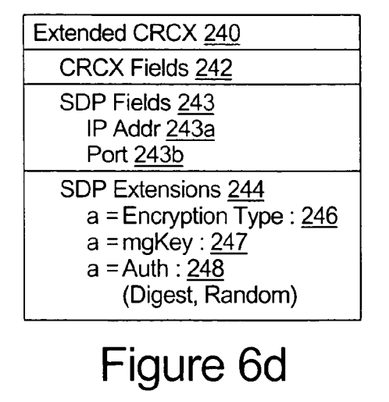
FIG. 6d is a table representing an extended CRCX message in accordance with one embodiment of the present invention.

Returning to FIG. 4, step 108 represents the call agent 14 sending an extended CRCX message 240 as shown in FIG. 6d to the caller RTP endpoint 16a.

Turning briefly to FIG. 6d in conjunction with FIG. 1, an exemplary extended CRCX message 240 comprises typical CRCX fields 242 compliant with known MGCP messaging specifications as well as SDP fields 243 and SDP extensions 244.

The SDP fields 243 define the media session, or more specifically comprise an IP address 243a and port number 243b defining a socket to which the real time media frames are sent.

The SDP extensions 244 include: i) an encryption type identifier field 246 for inclusion and identification of the symmetric encryption algorithm 29 to be used for the secure media session 18; ii) an "mgkey" field 247 for inclusion and identification of a public value useful for calculating a key for the symmetric encryption algorithm 29; and iii) an "auth" field 248 for inclusion and identification of a digest.

Returning to FIG. 4, step 108 includes the call agent 14 populating the fifth random number and the seventh digest value 507 into the "auth" field 248 of the SDP extensions 244 of the extended CRCX message 240 before sending to the caller RTP endpoint 16a. At step 108, the session description is not yet available and therefore the SDP fields 243 are not included in the CRCX message sent at step 108.

Step 110 represents the secure extension module 38 of the caller RTP endpoint 16a verifying the seventh digest value 507. Step 112 represents the secure extension module 38 of the caller RTP endpoint 16a generating: i) a second public/private value pair (e.g. EPT(A)_Private_2 and EPT(A)_Public_2; ii) a sixth random number; and iii) an eight digest value 508.

Similar to EPT(A)_Public_1 and EPT(A)_Private_1, EPT(A)_Private_2 is a random integer between a value of one and the predetermined large prime number 24 referred to as "P" and EPT(A)_Public_2 is:

$$EPT(A)\_Public\_2 = G^{(EPT(A)\_Private\_2)} \bmod P.$$

Referring briefly to FIG. 5, the eight digest value 508 is the result of performing the MD5 hash algorithm 34 on a combination of: i) the Kpub(A); ii) EPT(A)_Public_2; and ii) the sixth random number.

Figure 6E:
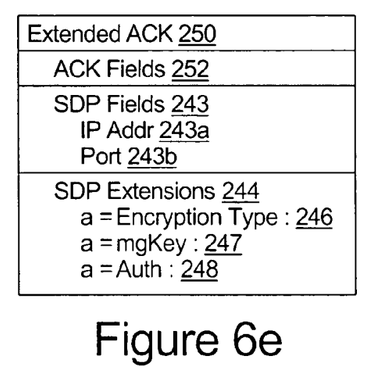
FIG. 6e is a table representing an extended ACK message in accordance with one embodiment of the present invention.

Returning to FIG. 4, step 114 represents the caller RTP endpoint 16a sending an extended ACK message 250, as represented in FIG. 6e, to the call agent 14.

More specifically, and with reference to FIG. 6e, the extended ACK message 250 comprises typical ACK fields 252 compliant with known MGCP messaging specifications as well as the SDP fields 243 and the SDP extensions 244 discussed with respect to FIG. 6d.

Returning to FIG. 4, step 114 represents populating its session description (including its IP address and selected port number for the media session) into the SDP fields 243, EPT(A)_Public_2 into the "mgkey" field 247, and the eight digest value 508 into the "auth" field 248 of the SDP extensions 244 before sending the extended ACK message 250 to the call agent 14.

After receiving the extended ACK message at step 114, the secure extension module 32 of the call agent 14 verifies the eight digest value 508 at step 116.

Step 118 represents the secure extension module 32 of the call agent 14 generating a seventh random number and a ninth digest value 509. Referring again to FIG. 5, the ninth digest value 509 is the result of performing the MD5 hash algorithm 34 on a combination of: i) the Kpub(B); ii) EPT(A)_Public_2; and ii) the seventh random number.

Returning to FIG. 4, at step 120, the call agent 14 populates the session description (including IP address and port number) received at step 114 into the SDP fields 243, populates EPT(A)_Public_2 into the "mgkey" field 247, and populates both the seventh random number and the ninth digest value 509 into the "auth" field 248 of the SDP extensions 244 of an extended CRCX message 240 for sending to the callee RTP endpoint 16b.

Step 122 represents the secure extension module 38 of the callee RTP endpoint 16b verifying the ninth digest value 509 and step 124 represents the secure extension module 38 of the callee RTP endpoint 16b generating its second public/private value pair (e.g. EPT(B)_Private_2 and EPT(B)_Public_2). EPT(B)_Private_2 is a random integer between a value of one and the predetermined large prime number 24 referred to as "P" and EPT(B)_Public_2 is:

$$EPT(B)\_Public\_2 = G^{(EPT(B)\_Private\_2)} \bmod P.$$

Step 126 represents the secure extension module 38 of the callee RTP endpoint 16b calculating a media key 42 for use with the symmetric encryption algorithm 29 for securing the media session 18. More specifically, the media key 42 is calculated as follows:

$$\text{Media Key} = (EPT(A)\_Public\_2)^{(EPT(B)\_Private\_2)} \bmod P.$$

Step 128 represents the secure extension module 38 of the callee RTP endpoint 16b generating an eighth random number and a tenth digest value 510. Referring again to FIG. 5, the tenth digest value 510 is the result of performing the MD5 hash algorithm 34 on a combination of: i) KpubB; ii) EPT(B)_Public_2; and ii) the eight random number.

Step 130 represents the callee RTP endpoint 16b populating its session description (including the IP address and port number selected for the media session) into the SDP fields 243, EPT(B)_Public_2 into the "mgkey" field 247, and the tenth digest value 510 into the "auth" field 248 of the SDP extensions 244 of an extended ACK 250 for sending to the call agent 14.

Step 132 represents the secure extension module 32 of the call agent 14 verifying the tenth digest value 510 and step 134 represents the secure extension module 32 of the call agent 14 generating a ninth random number and an eleventh digest value 511. Referring again to FIG. 5, the eleventh digest value 511 is the result of performing the MD5 hash algorithm 34 on a combination of: i) KpubA; ii) EPT(B)_Public_2; and ii) the ninth random number.

Figure 6F:
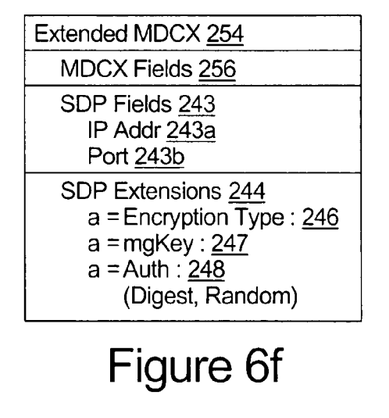
FIG. 6f is a table representing an extended MDCX message in accordance with one embodiment of the present invention.

Step 134 represents the call agent 14 sending an extended MDCX message 254, as represented in FIG. 6f, to the caller RTP endpoint 16a. The extended MDCX message 254 comprises typical MDCX fields 256 compliant with known MGCP messaging specifications as well as the SDP fields 243 and the SDP extensions 244 discussed with respect to FIG. 6d. Step 134 represents populating the session description received at step 130 (including IP address and port number) into the SDP fields 243, populating EPT(B)_Public_2 into the "mgkey" field 247, and populating both the ninth random number and the eleventh digest value 511 into the "auth" field 248 of the SDP extensions 244 before sending the extended MDCX message 254 to the caller RTP endpoint 16b.

Step 136 represents the secure extension module 38 of the caller RTP endpoint 16a verifying the eleventh digest value 511 and step 138 represents the secure extension module 38 of the caller RTP endpoint 16a calculating the media key 42 as:

$$\text{Media Key} = (EPT(B)\_Public\_2)^{(EPT(A)\_Private\_2)} \bmod P.$$

At this time, both the caller RTP endpoint 16a and the callee RTP endpoint 16b have independently calculated the media key 42 and the peer to peer secure media session 18 between the two may commence.

It should be appreciated that: i) each RTP endpoint 16 establishing an authenticated signaling session 50 with the secure call agent 14; and ii) exchanging values needed for calculating a shared secret media key 42 for a symmetric encryption algorithm 29 through the authenticated signaling sessions, enables an RTP media session to be secured, and the two endpoints to be assured the other endpoint is the purported endpoint, without reliance on asymmetric encryption algorithms and digital certificates.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A method of operating a call agent to establish a shared secret media key between each of a caller endpoint and a callee endpoint, the method comprising:
   establishing a caller authenticated signaling session with the caller endpoint using a caller shared secret authentication key and an authentication hash algorithm, establishing the caller authenticated signaling session comprising:
      receiving a restart in progress message from the caller endpoint, the restart in progress message comprising:
         a first random number generated by the caller endpoint;
         the caller public value, the caller public value being a remainder of a generator value raised to the power of a private value divided by a predetermined large prime number; and
         a first digest value, the first digest value being the result of performing a hash algorithm on a unique identifier of the caller endpoint, an initial security key, the caller public value, and the first random number;
      determining that the digest value is verified if the digest value matches a result of performing the hash algorithm on a combination of the unique identifier of the caller endpoint from the message, the initial security key stored in association with the identifier of the caller endpoint by the call agent in a client authentication table, the caller public value from the message, and the first random number from the message; and
      establishing the signaling session only if the digest value is verified, establishing the signaling session comprising
      generating a local public value and a local private value of a pair of values, the local public value being a remainder of the generator value raised to the power of the local private value divided by the predetermined large prime number;
      calculating the caller shared secret authentication key, the caller shared secret authentication key being a remainder of the caller public value raised to the power of the local private value divided by the predetermined large prime number; and
      providing the local public value to the caller endpoint;
   establishing a callee authenticated signaling session with the callee endpoint using a callee shared secret authentication key and an authentication hash algorithm;
   receiving caller public value from the caller endpoint through the caller authenticated signaling session, the caller public value being a public value of a pair of values generated by the caller endpoint and useful for calculating the shared secret media key;

sending the caller public value to the callee endpoint using the callee authenticated signaling session;

receiving a callee public value from the callee endpoint through the callee authenticated signaling session, the callee public value being a public value of a pair of values generated by the callee endpoint, independent of the pair of values generated by the caller endpoint, and useful for calculating the shared secret media key;

sending the callee public value of the caller endpoint using the caller authenticated signaling session.

2. The method of claim 1, wherein:

the step of receiving a caller public value from the caller endpoint through the caller authenticated signaling session comprises:
  authenticating the caller public value by including the caller public value in a group of values comprising the caller shared secret authentication key and performing the authentication hash algorithm thereon to generate a local caller digest value; and
  comparing the local caller digest value to a caller digest value received from the caller endpoint in conjunction with the caller public value; and the step of sending the callee public value of the caller endpoint through the caller authenticated signaling session comprises:
  including the callee public value in a group of values comprising the caller shared secret authentication key and performing the authentication hash algorithm thereon to generate a response digest value;
  sending the response digest value in conjunction with the callee public value to the caller endpoint.

3. The method of claim 1, wherein the step of receiving a caller public value from the caller endpoint comprises receiving a create connection message through the caller authenticated signaling session, the create connection message comprising a caller session description in conjunction with the caller public value, the caller session description including identification of an IP address and port number defining a caller socket to which real time media frames are to be sent and secured using a symmetric encryption algorithm and the shared secret media key;

the method further comprises sending the caller session description in conjunction with the caller public value to the callee endpoint using the callee authenticated signaling session;

the step of receiving a callee public value form the callee endpoint comprises receiving a create connection message through the callee authenticated signaling session, the create connection message comprising a callee session description in conjunction with the callee public value, the callee session description including identification of an IP address and port number defining a callee socket to which real time media frames are to be sent and secured using the symmetric encryption algorithm and the shared secret media key; and the method further comprises sending the callee session description in conjunction with the callee public value to the caller endpoint using the caller authenticated signaling session.

4. A method of operating a real time protocol endpoint for securing a real time media session with a remote endpoint using a symmetric encryption algorithm and a shared secret media key, the method comprising:

establishing an authenticated signaling session with a secure intermediary agent using a shared secret authentication key and an authentication hash algorithm, establishing the authenticated signaling session comprising:
  generating a first random number;
  generating a first public value and a first private value of a pair of values useful for calculating the shared secret authentication key, the first public value being a remainder of a generator value raised to the power of the first private value divided by a predetermined large prime number;
  generating a first digest value, the first digest value being the result of performing a hash algorithm on a unique identifier of the endpoint, an initial security key, the caller public value, and the first random number;
  providing a restart in progress message to the agent, the restart in progress message comprising:
    the first random number;
    the first public value; the
    the digest value;
  receiving a request notification message from the agent, the request notification message comprising:
    a second random number
    an agent public value, the agent public value being a remainder of the generator value raised to the power of an agent private value divided by the predetermined large prime number; and
    a second digest value, the second digest value being the result of performing the hash algorithm on the initial security key, the shared secret authentication key, the agent public value, and the second random number; and
  calculating the shared secret authentication key as a remainder of the call agent public value raised to the first private value divided by the predetermined large prime number;

generating a media public value and a media private value of a pair of values useful for calculating the shared secret media key;

providing the media public value to the agent through the authenticated signaling session;

receiving a remote public value from the agent through the authenticated signaling session, the remote public value being a public value of a pair of values generated by the remote endpoint useful for calculating the shared secret media key;

calculating the shared secret media key as a function of the remote public value and the media private value;

encrypting real time media sent to the remote endpoint using the symmetric encryption algorithm and the shared secret media key; and deciphering real time media sent from the remote endpoint using the symmetric encryption algorithm and the shared secret media key.

5. The method of operating a real time protocol endpoint of claim 4 wherein:

the step of providing the media public value to the agent through the authenticated signaling session comprises:
  including the media public value in a group of values comprising the shared secret authentication key and performing the authentication hash algorithm thereon to generate a digest value;
  sending the digest value in conjunction with the media public value to the agent; and the step of receiving the remote public value from the agent through the authenticated signaling session comprises:

authenticating the remote public value by including the remote public value in a group of values comprising the shared secret authentication key and performing the authentication hash algorithm thereon to generate a local digest value; and comparing the local digest value to a digest value received from the agent in conjunction with the remote public value.

6. The method of operating a real time protocol endpoint of claim 4, further comprising:

sending a create connection message to the agent, the create connection message comprising a local session description in conjunction with the media public value, the local session description including identification of an IP address and port number defining a local socket to which real time media frames are to be sent and secured using the symmetric encryption algorithm and the shared secret media key;

receiving a request notification message from the agent, the request notification message comprising a remote session description in conjunction with the remote public value, the remote session description including identification of a remote IP address and port defining a remote socket to which real time media frames are to be sent to the remote endpoint and secured using the symmetric encryption algorithm and the shared secrete media key; and wherein:

encrypting real time media sent to the remote endpoint using the symmetric encryption algorithm and the shared secret media key further comprises sending the encrypted real time media to the remote socket in accordance with the remote session description; and deciphering real time media sent from the remote endpoint using the symmetric encryption algorithm and the shared secret media key further comprises receiving encrypted real time media at the local socket in accordance with the local session description.

* * * * *